United States Patent [19]

Kachnik

[11] 4,279,337
[45] Jul. 21, 1981

[54] POSITIVE DRIVE CONVEYOR SYSTEM

[76] Inventor: Joseph E. Kachnik, 3704 Highway 377 So., Fort Worth, Tex. 76116

[21] Appl. No.: 73,905

[22] Filed: Sep. 10, 1979

[51] Int. Cl.³ ............................................. B65G 37/00
[52] U.S. Cl. .................................... 198/472; 104/165; 105/29 TL; 198/854
[58] Field of Search ............... 198/472, 791, 795, 790, 198/789, 473, 854, 834; 104/165, 147 R, 237, 23 FS; 105/29 R; 108/20, 22; 29/121.1

[56] References Cited

U.S. PATENT DOCUMENTS

| 863,590 | 8/1907 | Cowley | 198/472 X |
| 946,355 | 1/1910 | Harden | 198/854 X |
| 1,966,017 | 7/1934 | McEvoy | 104/165 |

FOREIGN PATENT DOCUMENTS 959505  2/1957  Fed. Rep. of Germany ........... 198/854

*Primary Examiner*—Robert B. Reeves
*Assistant Examiner*—Douglas D. Watts
*Attorney, Agent, or Firm*—James E. Bradley

[57] ABSTRACT

A conveyor system for conveying trays containing articles has a positive drive for enabling extreme angles of inclination of the conveyor system. The conveyor system includes a plurality of spaced apart drive rollers, each having an annular row of teeth. The tray has a row of teeth that engages the teeth of the drive rollers. A drive system, which is preferably a belt having teeth on its outer surface, rotates the drive rollers. The drive rollers have cylindrical portions on each side of the teeth of lesser diameter than the teeth. The teeth on the bottom of the tray are located in a recessed channel, with flat surfaces on either side that engage the cylindrical portions. This enables the tray to be used also on a conventional conveyor system.

2 Claims, 2 Drawing Figures

POSITIVE DRIVE CONVEYOR SYSTEM

BACKGROUND OF THE INVENTION

1. Field of the Invention

This invention relates in general to conveyor systems and in particular to a conveyor system for carrying articles in trays, wherein the trays are positively driven.

2. Description of the Prior Art

Many conventional conveyor systems include a flat driven belt or rollers wherein the articles to be conveyed are carried in article carriers such as trays, boxes, cartons and the like. The trays are placed on the belt and held in place only by friction. While this is suitable for horizontal travel, if the belt inclines substantially, such as moving articles from one floor of a building to another floor, the friction may be insufficient to retain the trays in position. Also, when changing inclination a separate drive system must be employed.

A conveyor system with a positive drive for the trays rather than friction would avoid the problem with inclined conveyors. However, to avoid having to replace the entire system, the positively driven trays should be operable both on conventional conveyor systems and on the positively driven conveyor system. Also, the trays should be able to move automatically from one system to another system.

SUMMARY OF THE INVENTION

It is accordingly a general object of this invention to provide an improved conveyor system.

It is a further object of this invention to provide an improved conveyor system utilizing article carriers that are positively driven.

It is a further object of this invention to provide an improved conveyor system utilizing article carriers that are positively driven to maintain spacing and that are also operable on conventional conveyor systems.

It is a further object of this invention to provide an improved conveyor system that can change inclinations but still utilize only one drive belt and drive motor.

In accordance with these objects, a conveyor system is provided that includes a plurality of spaced apart driven rollers. Each roller is cylindrical, except for an annular row of teeth in the center protruding from the cylindrical portions. These rollers are driven by a belt having mating teeth, or by other means. Each article carrier or tray has a flat bottom except for a recessed channel in the center. The flat bottom engages the cylindrical portions of the rollers. Teeth are located in the channel for engaging the protruding teeth of the rollers to positively drive the tray. The teeth in the channel do not protrude past the channel, enabling the tray to be conveyed on a conventional belt or roller conveyor.

DESCRIPTION OF THE PREFERRED EMBODIMENT

Figure 1:
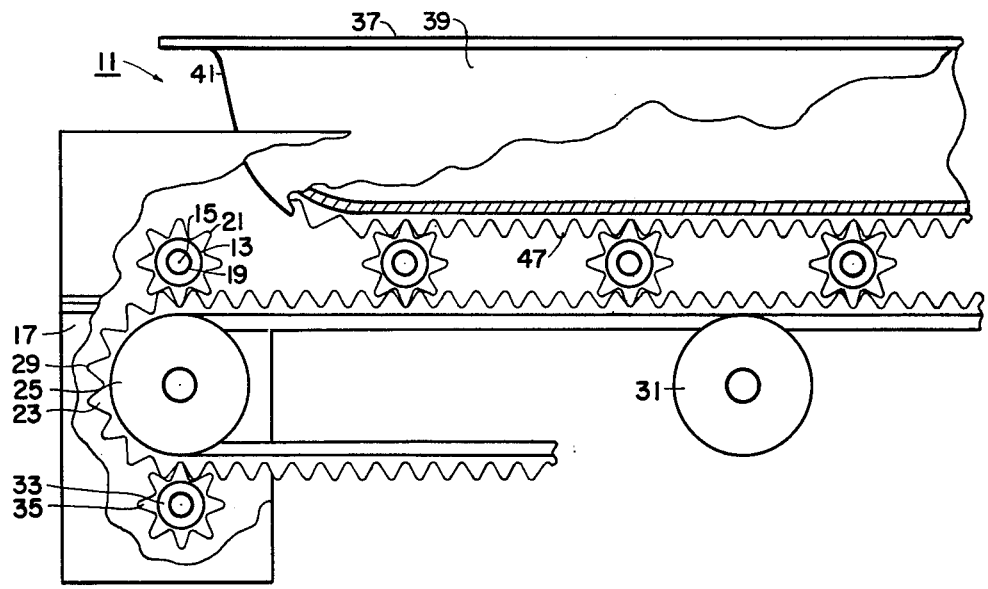
FIG. 1 is a side elevational view, partially sectioned, of a portion of a conveyor system constructed in accordance with this invention.

Referring to FIG. 1, conveyor system 11 includes a plurality of drive rollers 13. As shown also in FIG. 2, each drive roller 13 has an axle 15 carried by suitable bearings in a frame 17. Each drive roller 15 has two cylindrical portions 19 separated by an annular row of teeth 21. The row of teeth 21 is about one third the width of the drive roller 13 and is located in the center of the roller. Each tooth 21 protrudes outwardly past the cylindrical portions 19. The teeth, cogs or serrations 21 are preferably of molded rubber or other elastic material.

Drive rollers 13 are driven by a drive means that in the preferred embodiment includes a belt 23. Belt 23 is mounted below drive rollers 13 on pulleys 25. Pulleys 25 in the preferred embodiment have multiple grooves 27 (FIG. 2) for engaging "V's" or grooves formed on the underside of belt 23, although the underside could be flat. Pulleys 25 are driven by a conventional electric motor drive system. The outer side of belt 23 is comprised of a plurality of serrations or teeth 29. Teeth 29 are of the same pitch as and engage the teeth 21 of drive rollers 13. Belt 23 is preferably only slightly greater in width than the drive roller teeth 21, and is of substantially lesser width than the entire width of the drive rollers 13.

Figure 2:
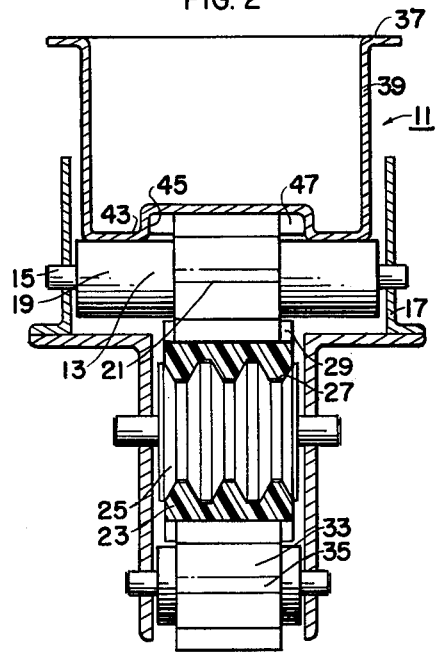
FIG. 2 is a partially sectioned front elevational view of the conveyor system of FIG. 1.

Referring to FIG. 1, an idler pulley 31 is positioned at various points along the length of belt 23 for maintaining the belt teeth 29 in engagement with the drive roller teeth 21. Idler pulley 31 is similar to pulley 25 in that it has multiple grooves (not shown) for engaging the longitudinal grooves on the underside of belt 23. An idler pulley 33 is mounted below belt 23 and has an annular row of teeth 35 for engaging the belt teeth 29. Idler pulley 33 supports the return side of the belt 23. As shown in FIG. 2, pulleys 25, 31 and 33 are mounted in bearings in frame 17.

An article carrier or tray 37 is adapted to engage the drive rollers 13. Tray 37, which also could be a skid or a platten, is a generally rectangular container having raised edges or sides 39. The top is open for placing articles to be conveyed in the tray 37. The forward and rearward sides 41 are formed in an inclined curve and are identical (only one side 41 is shown). The bottom of tray 37 has two substantially flat surfaces 43 separated by a channel 45. Channel 45 is centered between the two flat surfaces 43, and extends the length of tray 37. A plurality of serrations, cogs or teeth 47 are formed in channel 45. Each tooth 47 protrudes downwardly from channel 45 a distance no greater than the depth of channel 45. Teeth 47 have the same pitch as and are engaged by the drive roller teeth 21. Teeth 47 extend up the forward and rearward sides 41 a selected distance.

In operation, articles for conveying are placed inside tray 37. Tray 37 is placed on drive rollers 13. The tray teeth 47 engage the drive roller teeth 21, while the tray flat surfaces 43 contact the drive roller cylindrical surfaces 19. Pulley 25 is energized to rotate belt 23. The belt teeth 29 engage the drive rollers 13, causing them to rotate. This propels the tray 37 linearly similar to a rack and pinon drive.

It should be apparent that an invention having significant advantages has been provided. The trays are driven positively through the engagement of their teeth with the drive roller teeth. This avoids slippage if the belt is inclined. Starting or stopping the drive belt with the trays on the incline does not cause any problems since the trays will not slip and slide down the incline. This allows larger angles of inclination than available with belt conveyors. The positive drive tray will move directly from the positive drive system onto a conventional belt conveyor or roller system, its flat surfaces engaging the conventional system. The positive drive system enables the drive belt to be much narrower than conventional conveyor belts. The curved forward and rearward edges of the trays allows transition from horizontal to inclined positive drive systems to be made abruptly if desired or using very large radii at the transition.

Rollers 13 are located above belt 23 and retain it in engagement with pulleys 25 and 31. This enables changes of inclination to be made between the end pulleys 25. Consequently the system can traverse up or down an incline or horizontal with various transition combinations using only a single drive belt 23 and drive motor.

While the invention has been shown in only one of its forms, it should be apparent to those skilled in the art that it is not so limited but is susceptible to various changes and modifications without departing from the spirit thereof. For example a chain could be used in place of drive belt 23.

I claim:

1. A conveyor system comprising:
   a plurality of spaced apart drive rollers, each drive roller having an axis parallel to the axes of the other drive rollers, each roller having two cylindrical portions separated by an annular row of teeth protruding past the cylindrical portions;
   a belt mounted below the drive rollers on driven pulleys, the belt having a plurality of teeth on its outer surface for engaging the teeth of the drive rollers to rotate them;
   an article carrier for supporting conveyed articles, the article carrier having a recessed channel on its bottom surface extending the length of the article carrier, with substantially flat surfaces on each side of the channel that are adapted to engage the cylindrical portions of the drive rollers, the channel having a row of teeth protruding downwardly that is adapted to engage the teeth of the drive rollers, the teeth in the channel protruding downwardly no further than the depth of the channel;
   the article carrier comprising a tray having raised sides, the forward and rearward sides being inclined with respect to the bottom surface, with the teeth of the channel extending up the forward and rearward sides a selected distance to enable the conveyor system to change inclinations.

2. An article carrier adapted to be carried by a conveyor system, having an upper surface for carrying a conveyed article and a lower surface that is substantially flat except for a recessed channel substantially centered and extending the length of the article carrier, the channel having a plurality of downwardly protruding teeth for engaging a toothed drive roller, the teeth of the channel protruding no greater than the depth of the channel;
   the article carrier comprising a tray having raised sides, the forward and rearward sides being inclined with respect to the lower surface, with the teeth of the channel extending up the forward and rearward sides a selected distance to enable the conveyor system to change inclination.

* * * * *